(12) United States Patent
Nurishi

(10) Patent No.: US 6,847,495 B2
(45) Date of Patent: Jan. 25, 2005

(54) ZOOM LENS APPARATUS AND CAMERA SYSTEM

(75) Inventor: Ryuji Nurishi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/651,795

(22) Filed: Aug. 29, 2003

(65) Prior Publication Data

US 2004/0051966 A1 Mar. 18, 2004

(30) Foreign Application Priority Data

Aug. 30, 2002 (JP) ........................................ 2002-255355

(51) Int. Cl.[7] .............................................. G02B 15/14
(52) U.S. Cl. ...................................... 359/698; 359/685
(58) Field of Search ................................ 359/685, 686, 359/687, 688, 697, 698; 396/79

(56) References Cited

U.S. PATENT DOCUMENTS

| | | | |
|---|---|---|---|
| 4,609,260 A | 9/1986 | Kawai | 359/705 |
| 4,890,132 A | 12/1989 | Hama | 396/79 |
| 5,448,328 A | 9/1995 | Suzuki et al. | 396/133 |

FOREIGN PATENT DOCUMENTS

JP 58129404 8/1983 ............ G02B/7/04

Primary Examiner—David N. Spector
(74) Attorney, Agent, or Firm—Morgan & Finnegan, LLP (57) ABSTRACT

A small zoom lens apparatus capable of carrying out focusing through manual operations in an autofocus mode. The zoom lens apparatus includes a variator lens unit, an object-side focus lens unit placed closer to an object than the variator lens unit and an image plane-side focus lens unit placed closer to an image plane than the variator lens unit. Driving of the object-side focus lens unit through manual operations is allowed when the autofocus mode is set.

8 Claims, 10 Drawing Sheets

ZOOM LENS APPARATUS AND CAMERA SYSTEM

BACKGROUND OF THE INVENTION

1. Field of the Invention

The present invention relates to a zoom lens apparatus used in a camera such as TV camera and video camera.

2. Description of the Related Art

A rear focus type zoom lens with a focus lens unit (rear focus lens unit) placed closer to the image plane than a variator lens unit has an advantage in reducing size and weight of the focus lens unit, and is therefore widely used for an autofocus type zoom lens.

On the other hand, a front focus system with a focus lens unit (front focus lens unit) placed closer to an object than a variator lens unit keeps the same amount of movement of the focus lens unit even if magnification is changed and has an advantage for the variator lens unit, and is therefore widely used for a zoom lens apparatus for broadcasting and business which attach importance to manual operations.

In view of the above described positions, a zoom lens which uses a focus lens unit closer to the image plane side than a variator lens unit for autofocusing and uses a focus lens unit closer to an object than a variator lens unit for manual focusing is disclosed in Japanese Utility Model Publication No. S62(1987)-43286, Japanese Patent Publication No. H5(1993)-6163, Japanese Patent No. 2505835, Japanese Patent No. 2505840 and Japanese Patent No. 2561637.

For example, broadcast or professional video zoom lenses carry out faster and more accurate focusing operations or intentional focusing operations for image effects compared to consumer ones. However, these focusing operations may not be sufficiently supported by autofocusing alone, and so requires auxiliary manual focusing operations for autofocusing.

More specifically,
1. High-speed manual focusing operation: For example, when an out-of-focus amount is large and it is difficult to make a focusing determination or when manual focusing is carried out up to a position close to an in-focus position
2. High-accuracy manual focusing operation: When fine focusing is carried out through manual focusing, for example, when the nose of a person as an object is focused, the focus is changed to the eye
3. Intentional manual focusing operation: For example, when blurring is applied intentionally, when an object near the perimeter of the screen is focused or when the focus is switched among a plurality of objects at different distances at a fixed speed.

However, the focus lens unit with the zoom lenses disclosed in the above described publications cannot operate fine focusing because the respective front focus lens units are fixed during autofocusing.

Furthermore, it is also possible to use a rear focus lens unit for fine manual focusing during autofocusing, but it requires an operation mechanism different from the operation mechanism of the front focus lens unit such as an electronic ring, which makes the configuration complicated and produces an uncomfortable feeling during operation to users such as TV camera operators who are used to focusing operations using the front focus lens unit.

Furthermore, when a front focus lens unit is allowed to be moved without limitation during autofocusing, an in-focus range by autofocusing may be restricted by the position of the front focus lens unit, which will prevent the focusing from being achieved in the vicinity of infinity or the minimum object distance.

SUMMARY OF THE INVENTION

It is an object of the present invention to provide a small zoom lens capable of easily performing high-speed, high accuracy focusing through manual operations and allowing focusing through manual operations in an autofocus mode.

In order to attain the above described object, one aspect of the zoom lens apparatus of the present invention comprises a variator lens unit which moves in the direction of an optical axis and carries out power variation, an object-side focus lens unit which is placed closer to an object than the variator lens unit and moves in the direction of the optical axis to perform focusing and an image plane-side focus lens unit which is placed closer to the image plane than the variator lens unit and moves in the direction of the optical axis to perform focusing. The apparatus further comprises a controller which drives the image plane-side focus lens unit to perform autofocus control when an autofocus mode is set. When the autofocus mode is set, driving of the object-side focus lens unit through manual operations is allowed.

The features of the zoom lens apparatus and camera system of the invention will become more apparent from the following detailed description of a preferred embodiment of the invention with reference to the drawings.

DETAILED DESCRIPTION OF THE PREFERRED EMBODIMENTS

With reference now to the attached drawings, an embodiment of the present invention will be explained below.

Figure 1:
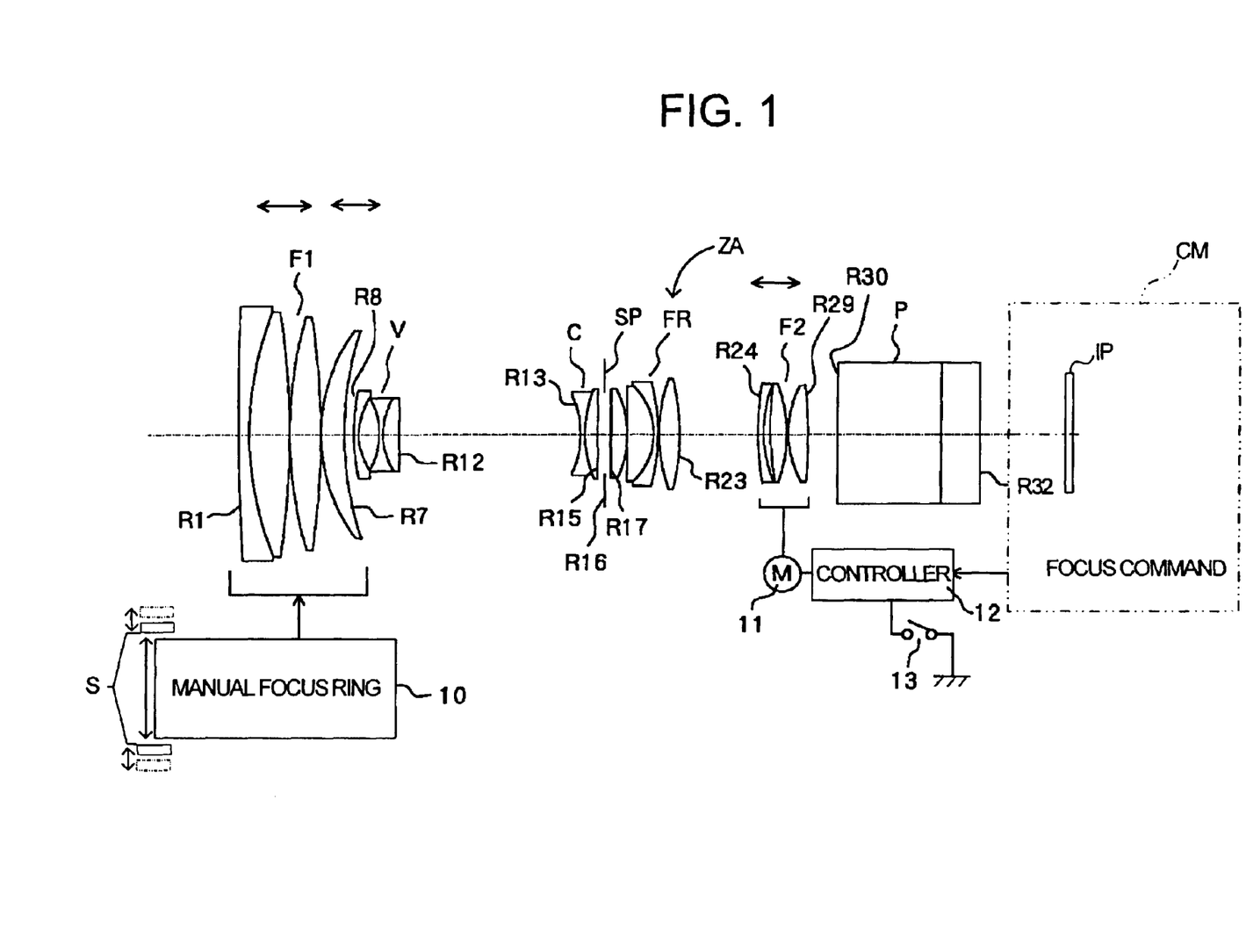
FIG. 1 is an optical sectional view of a zoom lens apparatus which is an embodiment of the present invention.

FIG. 1 is an optical sectional view of a zoom lens apparatus ZA which is an embodiment of the present invention at a wide-angle end.

Here, the lens unit of the zoom lens apparatus will be explained sequentially starting from components on the object side (left side in FIG. 1).

First, reference character F1 denotes a front focus lens unit (object-side focus lens unit) having positive optical power (reciprocal of focal length) as a first lens unit.

Reference character V denotes a variator lens unit having negative optical power for varying power as a second lens unit, which varies power by monotonously moving on the optical axis toward the image plane from the wide-angle end to the telephoto end.

Reference character C denotes a compensator lens unit having negative optical power as a third lens unit to compensate for variations in the image plane caused by power variation, which moves on the optical axis describing a nonlinear track which is convex toward an object.

Reference character SP denotes a diaphragm (stop) and FR denotes a relay lens unit which has positive optical power as a fourth lens unit and is fixed during power variation.

Reference character F2 denotes a rear focus lens unit (image plane-side focus lens unit) which has positive optical power as a fifth lens unit.

As shown above, it is possible to obtain a zoom lens apparatus having a wide field angle, high power and being small by specifying optical power of each lens unit.

Reference character P denotes an optical element such as a color separating prism and optical filter, and is illustrated as a glass block in the figure.

Reference character Ri (i=1 to 32) in FIG. 1 denotes an i-th optical plane from the object side. However, FIG. 1 assigns reference numerals only to optical surfaces of the respective lens units closest to the object or closest to the image plane and diaphragm SP and omits the rest.

Furthermore, reference numeral 10 denotes a manual focus ring which moves the front focus lens unit F1 in the direction of the optical axis through manual operations. Reference numeral 11 denotes a motor which drives the rear focus lens unit F2 in the direction of the optical axis.

Reference numeral 12 denotes a controller which drives the motor 11 and performs autofocus control using the rear focus lens unit F2 according to a focus command signal from a camera (TV camera or video camera, etc.) CM in which this zoom lens apparatus is mounted or provided as an integral part.

Reference numeral 13 denotes a mode selection switch which switches between a manual focus mode and autofocus mode. In a manual focus mode, no autofocus control by the controller 12 is carried out and in an autofocus mode, autofocus control by the controller 12 is carried out and manual operations of the front focus lens unit F1, which will be described later, can also be carried out.

Reference character IP in the camera CM denotes an image pickup element which receives the image of an object formed by the zoom lens apparatus ZA and photoelectrically converts this. The output signal from the image pickup element IP is subjected to various types of processing by an image processing circuit (not shown) provided inside the camera CM and recorded in a recording medium (not shown) such as a magnetic tape, semiconductor memory and optical disk.

FIGS. 2 to 5 show schematic views of the optical system of this zoom lens apparatus ZA. Up-arrows in the upper half in each figure indicate that the lens unit has positive optical power and down-arrows in the lower half indicate that the lens unit has negative optical power. Furthermore, straight lines or curves in the lower half in each figure indicate moving tracks between the wide angle end and telephoto end of the movable lens unit. Reference character MOD denotes the minimum object distance and ∞ denotes infinity.

Figure 2:
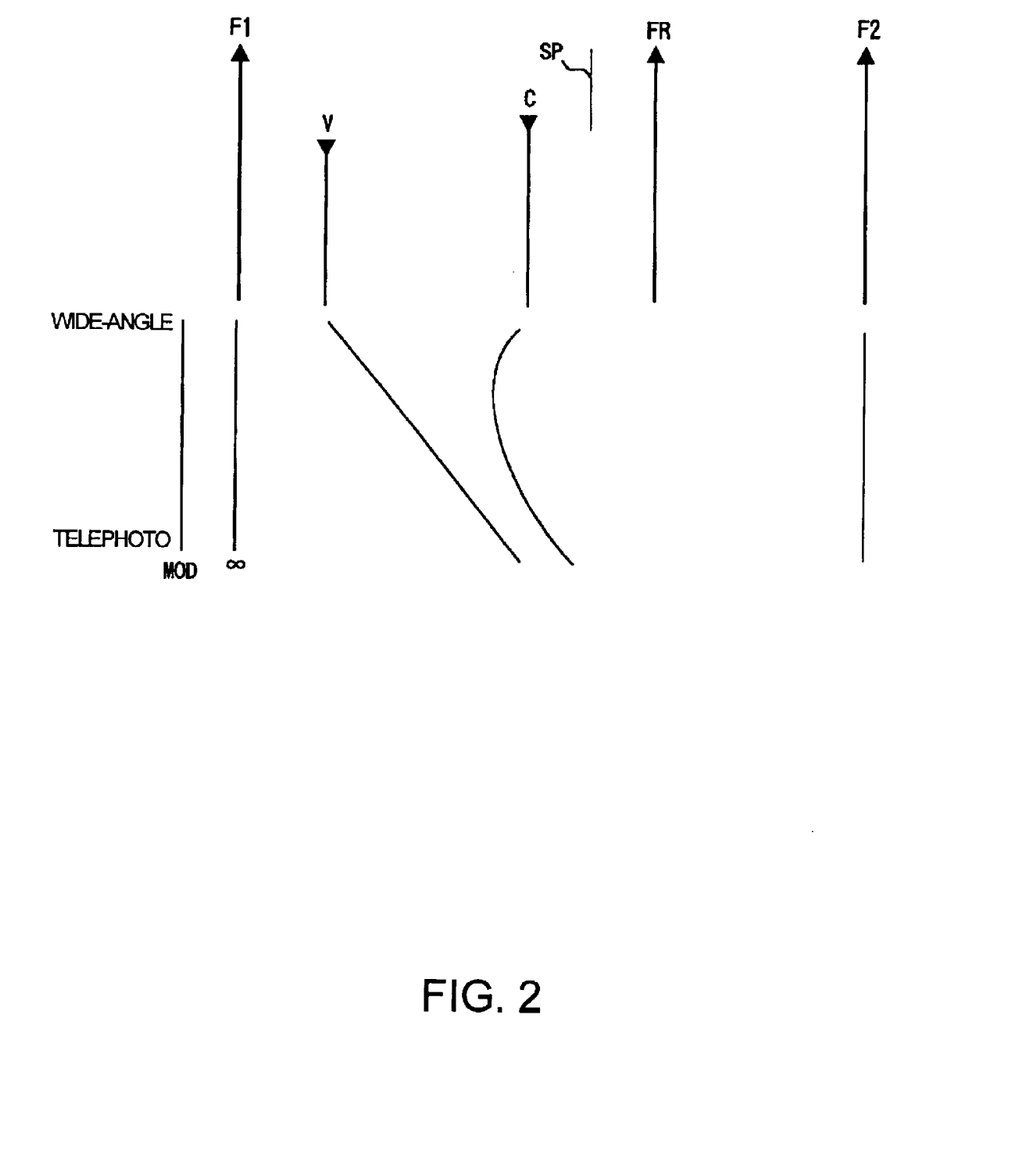
FIG. 2 is a schematic view when focusing operation is carried out by a front focus lens unit of the zoom lens apparatus.

FIG. 2 shows a case where the rear focus lens unit F2 is fixed and focusing is performed only using the front focus lens unit F1 between the minimum object distance and infinity. In this case, the movement amount of the front focus lens unit F1 does not change with the zooming state (focal length of the entire system).

Figure 3:
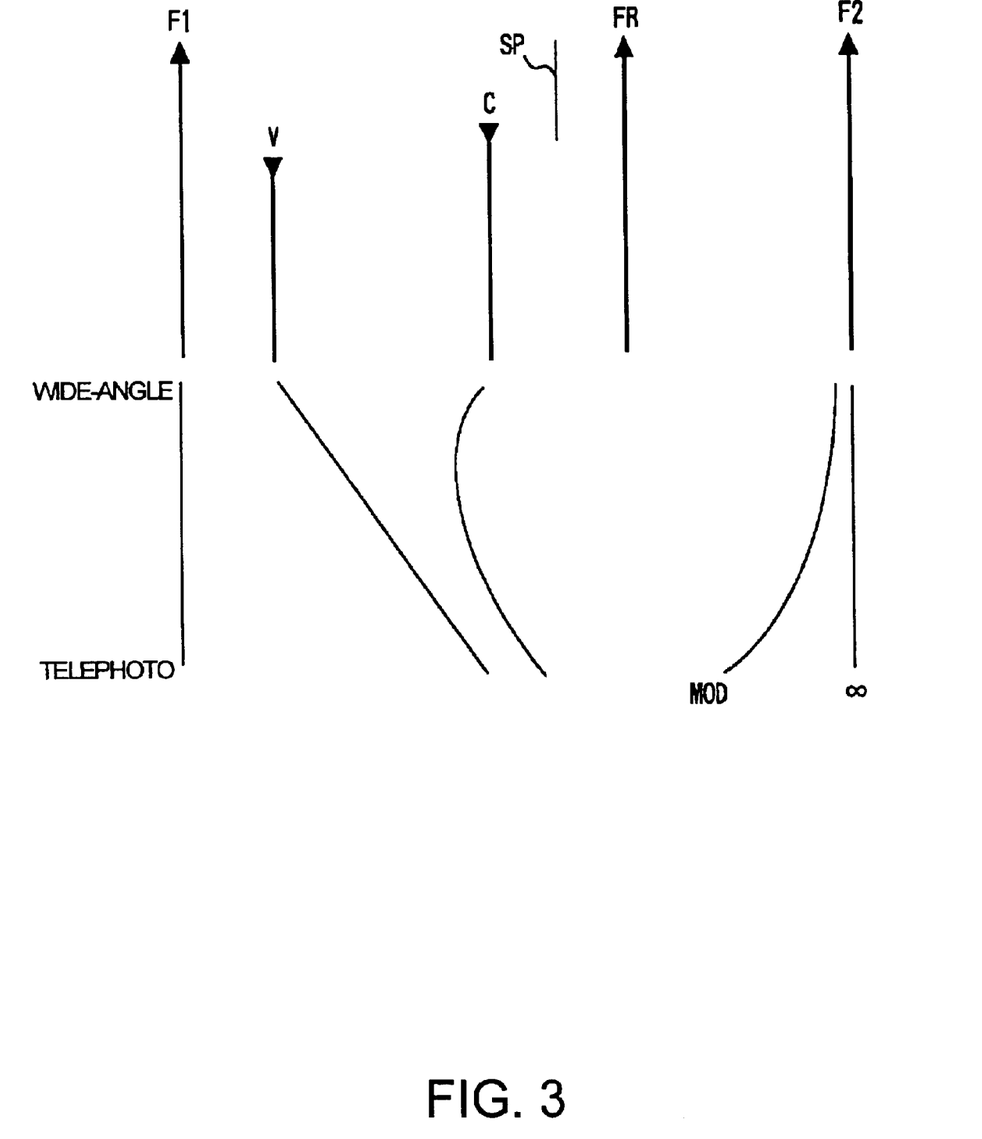
FIG. 3 is a schematic view when focusing operation is carried out by a rear focus lens unit of the zoom lens apparatus.

FIG. 3 shows a case where focusing is performed using the rear focus lens unit F2 between the minimum object distance and infinity. In this case, the movement amount of the rear focus lens unit F2 changes with the zooming state and increases as the zooming state comes closer to the telephoto side.

Figure 4:
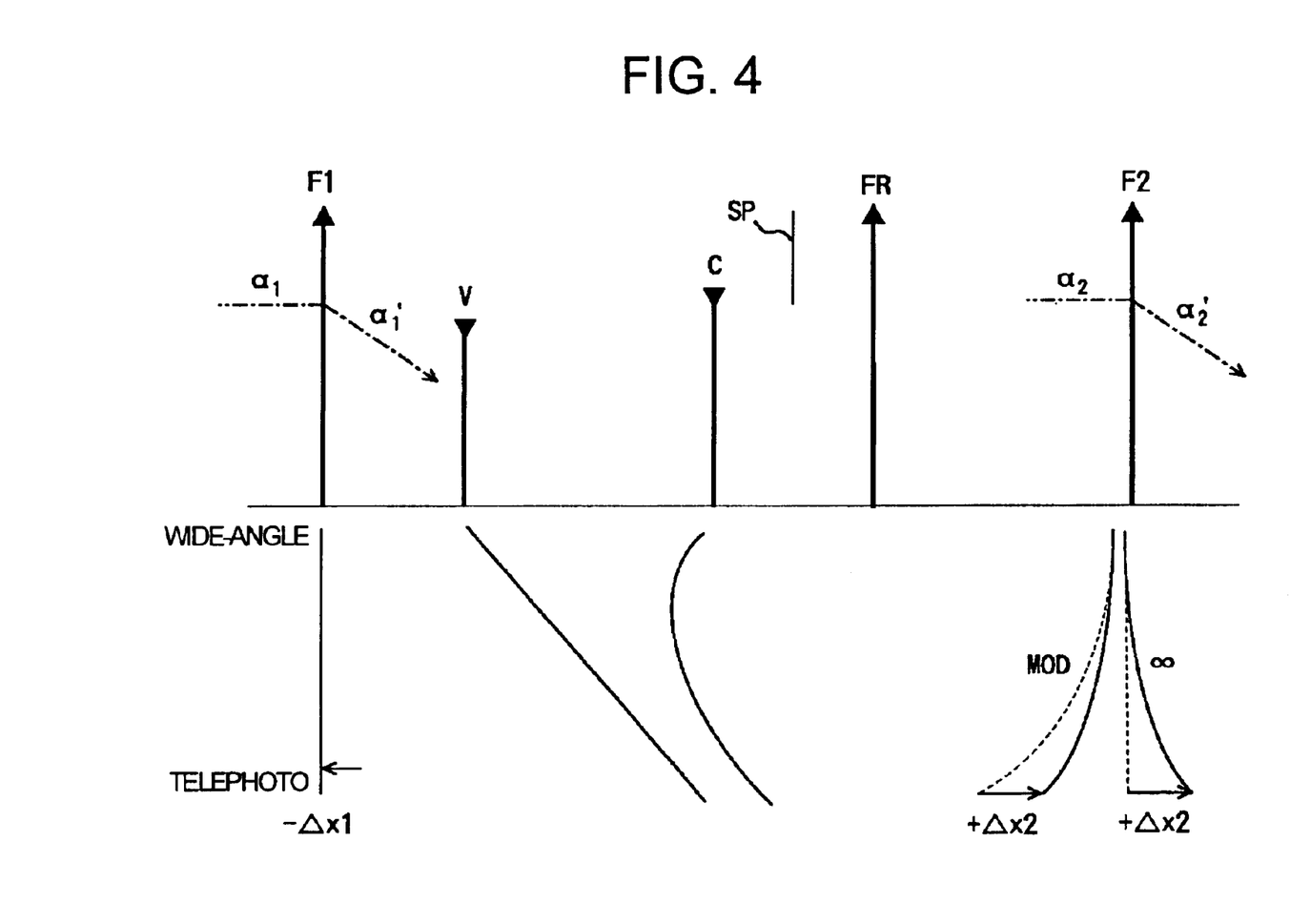
FIG. 4 is a schematic view when the front focus lens unit of the zoom lens apparatus is moved by $\Delta x1$ toward an object in an autofocus mode.

FIG. 4 shows the front focus lens unit F1 which has been moved from the position where focusing to infinity is achieved (hereinafter referred to as the infinity focusing position) toward the object by $\Delta x1$ ($-\Delta x1$) for fine adjustment of focusing in an autofocus mode in which autofocusing is carried out by the controller 12 driving the rear focus lens unit F2. In FIG. 4, the moving track of the rear focus lens unit F2 between infinity and the minimum object distance is deviated from the moving track shown in FIG. 3 toward the image plane and the amount of deviation $\Delta x2$ ($+\Delta x2$) becomes a maximum at the telephoto end.

Figure 5:
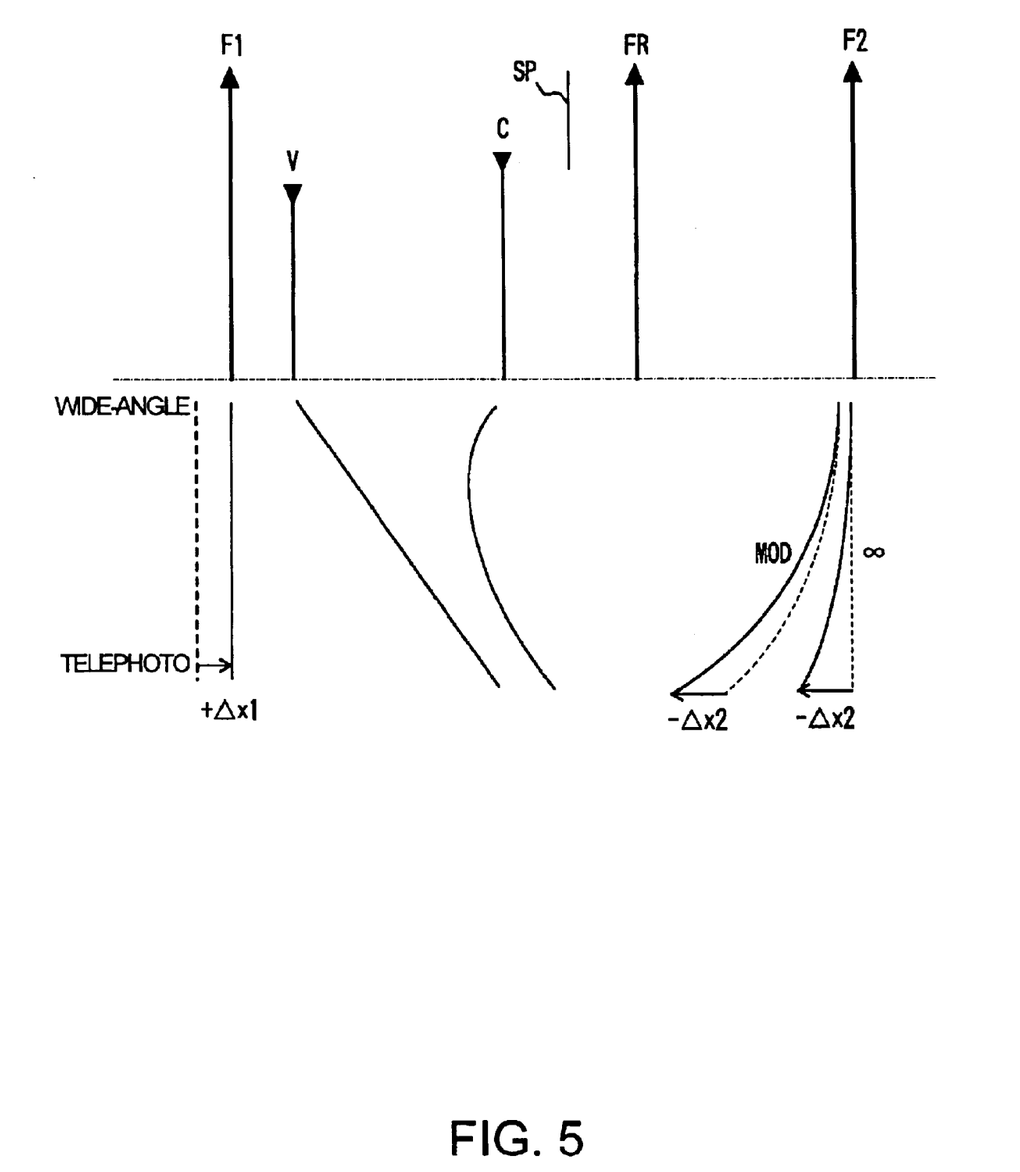
FIG. 5 is a schematic view when the front focus lens unit of the zoom lens apparatus is moved by $\Delta x1$ toward an image plane in the autofocus mode.

FIG. 5 shows the front focus lens unit F1 which has been moved from the infinity focusing position toward the image plane by $\Delta x1$ ($+\Delta x1$). In this case, the moving track of the rear focus lens unit F2 is deviated toward the object which is the direction opposite that in the case of FIG. 4 and the amount of deviation $\Delta x2$ ($-\Delta x2$) reaches a maximum at the telephoto end.

Here, when converted inclination angles of the axial ray (axial marginal ray) before and after the front focus lens unit F1 (object side and image plane side) are $\alpha1$ and $\alpha1'$ and converted inclination angles of the axial ray before and after the rear focus lens unit F2 is $\alpha2$ and $\alpha2'$, back focal distance sensitivity dsk1 and dsk2 of the front focus lens unit F1 and rear focus lens unit F2 are expressed by:

$$dsk1 = \alpha1'^2 - \alpha1^2 \quad (1)$$

$$dsk2 = \alpha2'^2 - \alpha2^2 \quad (2)$$

Therefore, when the front focus lens unit F1 is moved by $\Delta x1$, variation $\Delta sk1$ of the back focal distance is expressed by:

$$\Delta sk1 = \Delta x1 \cdot dsk1 = \Delta x1(\alpha1'^2 - \alpha1^2) \quad (3)$$

Likewise, when the rear focus lens unit F2 is moved by $\Delta x2$, variation $\Delta sk2$ of the back focal distance is expressed by:

$$\Delta sk2 = \Delta x2 \cdot dsk2 = \Delta x2(\alpha2'^2 - \alpha2^2) \quad (4)$$

A movement amount $\Delta x2$ of the rear focus lens unit F2 to compensate for the variation $\Delta sk1$ in the back focal distance produced by the movement of the front focus lens unit F1, where $\Delta sk1 = -\Delta sk2$ is:

$$\Delta x2 = -\Delta x1 \cdot (\alpha2'^2 - \alpha2^2)/(\alpha1'^2 - \alpha1^2) \quad (5)$$

Therefore, in order to allow the rear focus lens unit F2 to perform focusing from infinity to the minimum object distance with the front focus lens unit F1 moved by $\pm\Delta x1$, it is necessary to secure a movement margin of at least $\Delta x2$ expressed by Expression (5) for the infinity and minimum object distance sides of the rear focus lens unit F2 beforehand.

Furthermore, the zoom lens apparatus of this embodiment preferably satisfies the following conditional expression (6):

$$1<|\Delta x2 \cdot (\alpha 2'^2 - \alpha 2^2)/\Delta x1 \cdot (\alpha 1'^2 - \alpha 1^2)|<1.2 \quad (6)$$

This conditional expression (6) is a condition for preventing the focusing range of autofocus by the rear focus lens unit F2 from the infinity to the minimum object distance from being limited when the front focus lens unit F1 is moved as a result of fine adjustment of focusing and specifies the relationship between the movement amount $\Delta x1$ of the front focus lens unit F1 and amount of movement margin $\Delta x2$ of the rear focus lens unit F2.

When the value of the above described ratio exceeds a lower limit of conditional expression (6), focusing cannot be achieved in the vicinity of infinity or in the vicinity of the minimum object distance when the front focus lens unit F1 moves. On the other hand, when the value of the above described ratio exceeds an upper limit of conditional expression (6), the space of movement of the rear focus lens unit F2 increases and the total length of the zoom lens increases, which is not preferable.

Furthermore, the zoom lens apparatus of this embodiment preferably satisfies the following conditional expression (7):

$$|\Delta x1/Sx1|<0.5 \quad (7)$$

where Sx1 denotes the movement amount of the front focus lens unit F1 from the position where focusing to the minimum object distance is achieved (hereinafter referred to as the minimum object distance focusing position) toward the object with respect to the infinity focusing position.

By specifying the upper limit of $\Delta x1$ as shown in conditional expression (7), it is possible to suppress upsizing of the zoom lens apparatus due to an increase in the movement amount of the front focus lens unit F1. That is, when the value of the above described ratio exceeds the upper limit of conditional expression (7), the movement amount of the front focus lens unit F1 increases, which will increase the diameter of the front focus lens unit F1 and the total length of the zoom lens considerably.

Furthermore, the movement amount $\Delta x2$ of the rear focus lens unit F2 to compensate for defocusing generated by the movement of the front focus lens unit F1 increases considerably, resulting in an increase in the space required before and after the rear focus lens unit F2, an increase in size of the zoom lens or an increase in aberration variations with the increase in the movement amount of the rear focus lens unit F2, which is not preferable.

In order to prevent the range of movement of the focus lens unit F1 from exceeding the movement amount $\Delta x1$ specified by at least one of conditional expressions (6) and (7) in the autofocus mode, it is preferable to limit the range of movement of the front focus lens unit F1 by providing a movable stopper (see Reference character S in FIG. 1) as a limiting member which operates only in the autofocus mode. This makes sure that any excessive manual operation (erroneous operation) of the front focus lens unit F1 in the autofocus mode is prevented.

The movable stopper S may be specifically constructed, for example, of a stopper S, a mechanism (not shown) which causes this stopper S to stick out within the operation range of the manual focus ring 10 in the autofocus mode and exit from the operation area in the manual focus mode and a mechanism (not shown) which moves the stopper S to a position in the operation area of the manual focus ring 10 in which it is possible to obtain $\Delta x1$ that satisfies conditional expressions (6) and (7). However, any configuration can be used if it is at least functionally equivalent.

NUMERICAL EXAMPLE

Table 1 shows a numerical example of the zoom lens apparatus of the above described embodiment. In Table 1, reference character f denotes the focal length of the entire system, ri, di, ni and vi denote the radius of curvature, distance between optical surfaces, refractive index and Abbe's number of the m-th optical surface from the object side, respectively.

Figure 6:
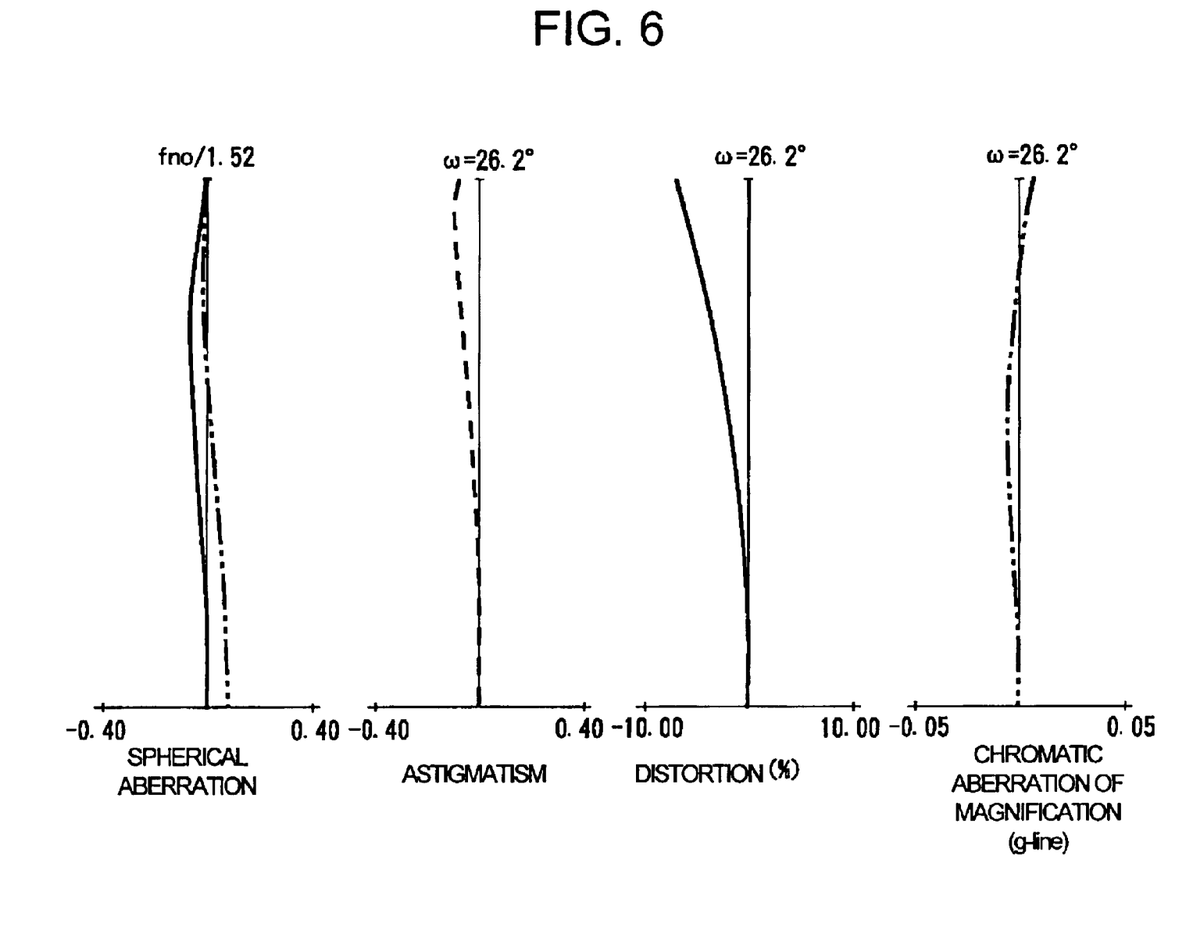
FIG. 6 is a sectional view of a numerical example of the above described embodiment at a wide-angle end.
Figure 7:
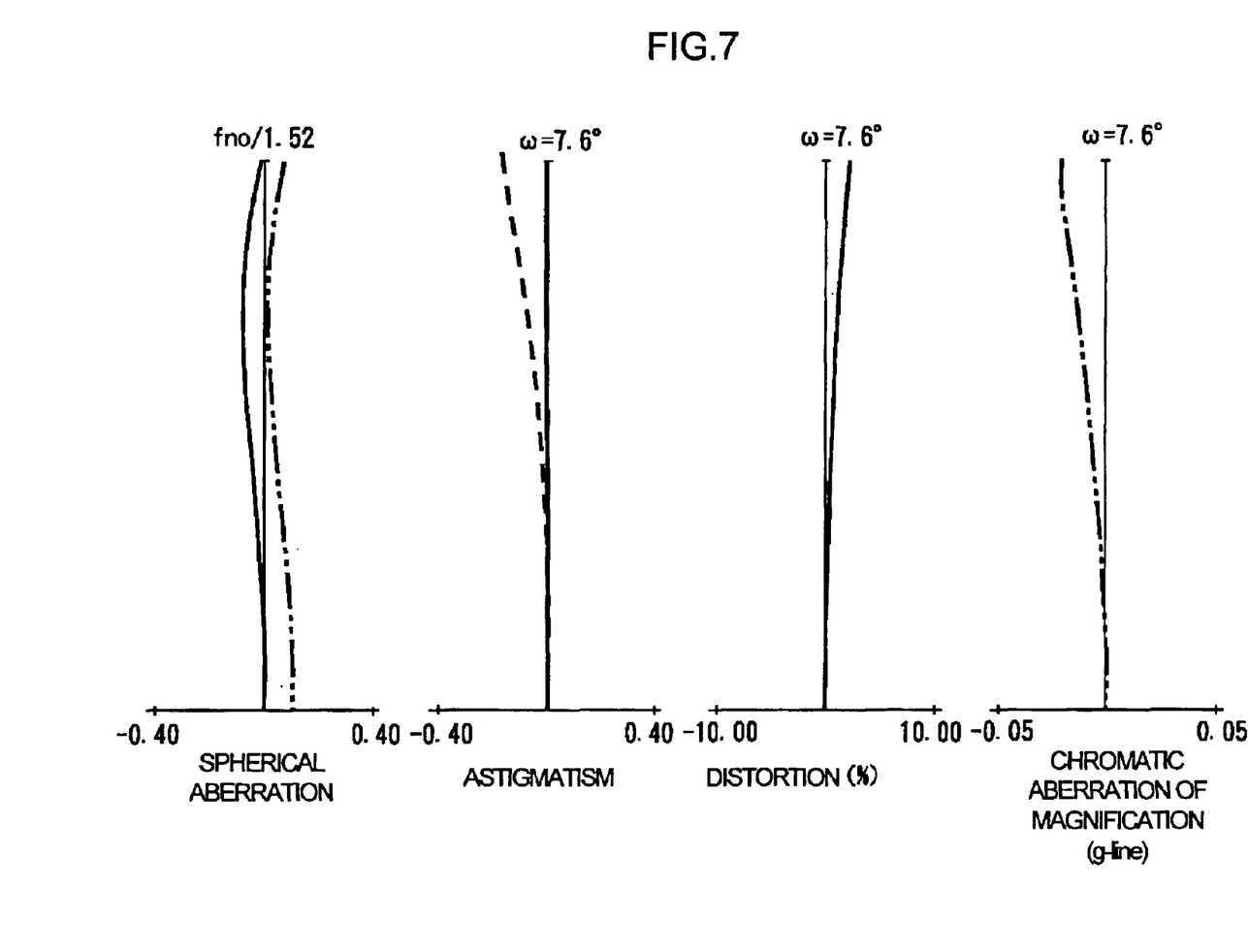
FIG. 7 illustrates aberration of the above described numerical example.
Figure 8:
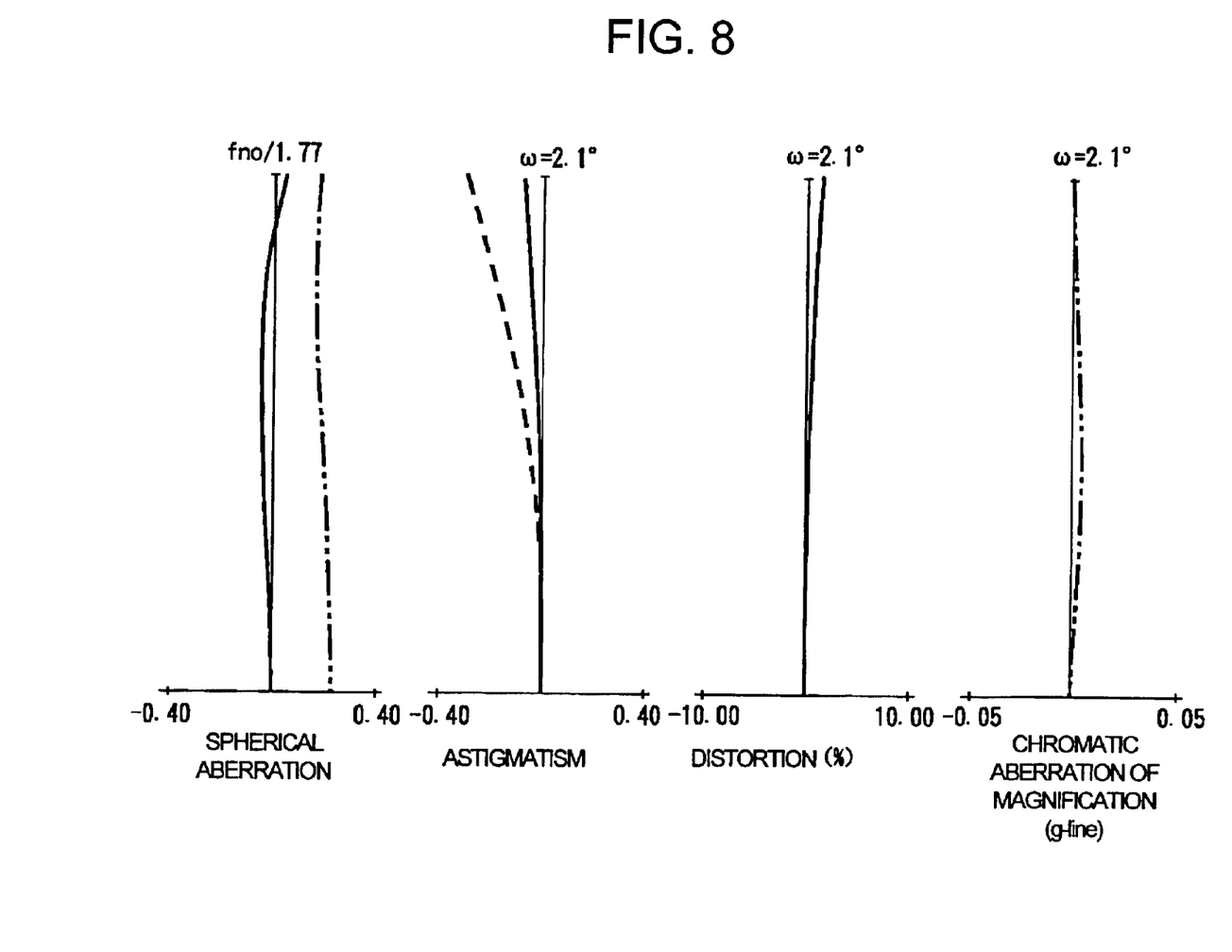
FIG. 8 illustrates aberration of the above described numerical example.
Figure 9:
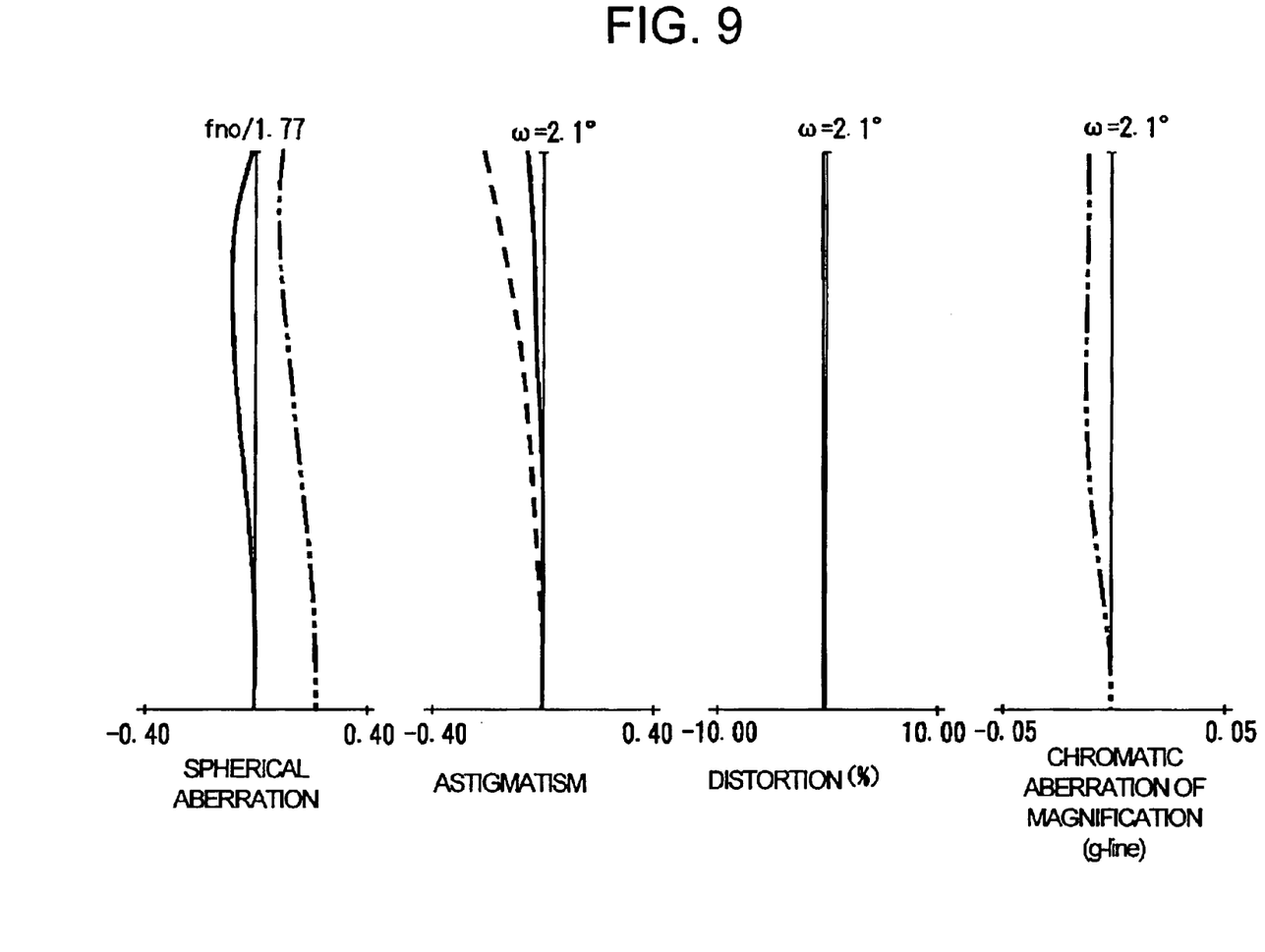
FIG. 9 illustrates aberration of the above described numerical example.
Figure 10:
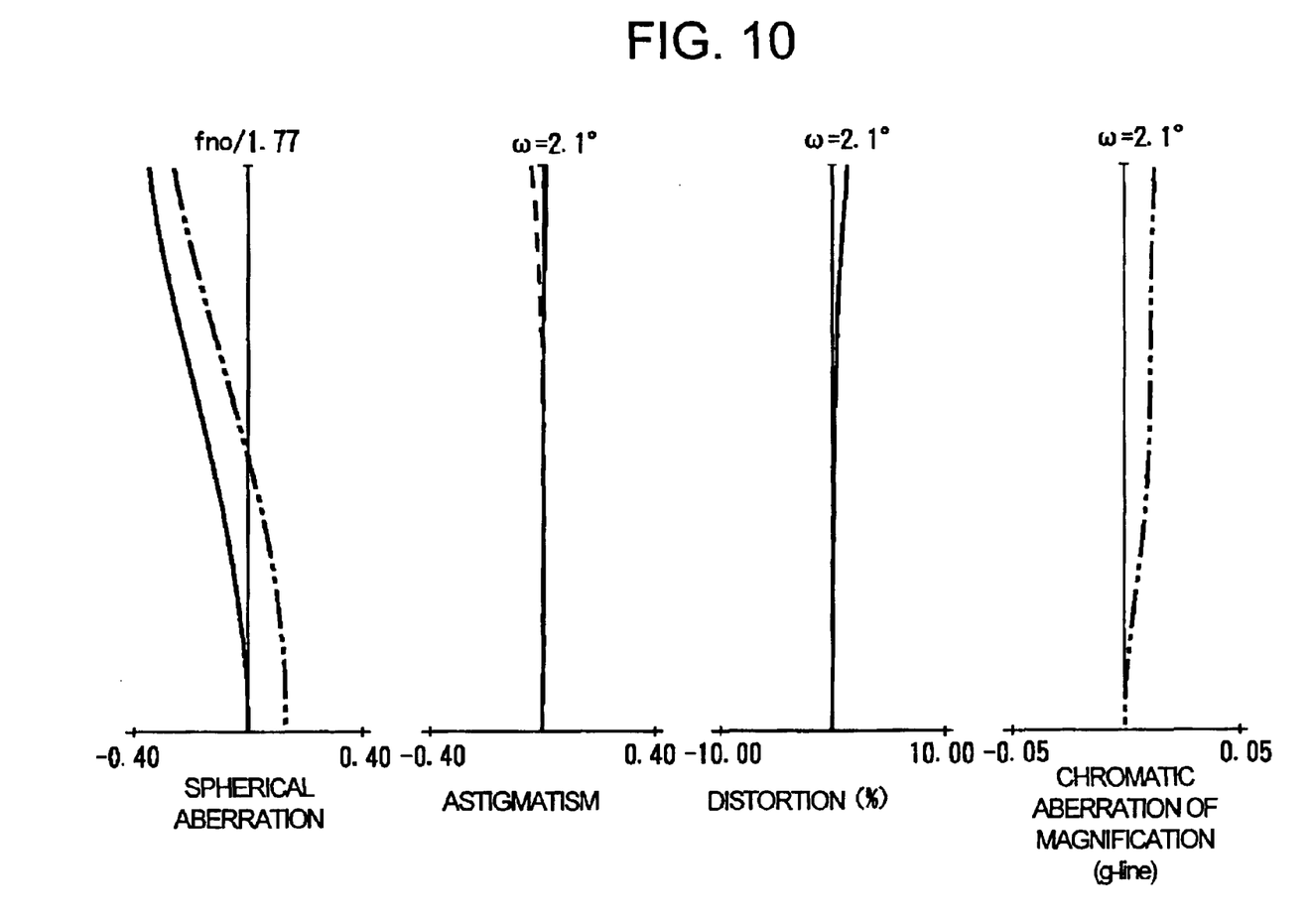
FIG. 10 illustrates aberration of the above described numerical example.

Furthermore, FIGS. 6 to 10 illustrate aberration of this numerical example. FIG. 6 illustrates aberration when focal length f=8.14 mm and the distance from the object is infinite, FIG. 7 illustrates aberration when focal length f=30.12 mm and the distance from the object is infinite, FIG. 8 illustrates aberration when focal length f=111.51 mm and the distance from the object is infinite, FIG. 9 illustrates aberration when focal length f=111.51 mm and focusing is achieved by the front focus lens unit F1 when the distance from the object is 1 m and FIG. 10 illustrates aberration when focal length f=111.51 mm and focusing is achieved by the rear focus lens unit F2 when the distance from the object is 1 m.

Numerical Reference

| f = 8.13945 (mm) | fno 1:1.52~1.77 | 2ω = 52.3°–4.1° | |
|---|---|---|---|
| r1 = 1169.481 | d1 = 2.40 | n1 = 1.81265 | v1 = 25.4 |
| r2 = 98.429 | d2 = 10.83 | n2 = 1.51825 | v2 = 64.2 |
| r3 = −265.170 | d3 = 0.20 | 1.00000 | |
| r4 = 124.037 | d4 = 8.29 | n3 = 1.60548 | v3 = 60.7 |
| r5 = −281.395 | d5 = 0.20 | 1.00000 | |
| r6 = 51.797 | d6 = 6.46 | n4 = 1.64254 | v4 = 60.1 |
| r7 = 97.915 | d7 = variable | 1.00000 | |
| r8 = 71.045 | d8 = 0.90 | n5 = 1.82017 | v5 = 46.6 |
| r9 = 17.601 | d9 = 6.01 | 1.00000 | |
| r10 = −21.542 | d10 = 0.90 | n6 = 1.77621 | v6 = 49.6 |
| r11 = 18.397 | d11 = 4.63 | n7 = 1.85501 | v7 = 23.9 |
| r12 = −4295.134 | d12 = variable | 1.00000 | |
| r13 = −27.245 | d13 = 0.90 | n8 = 1.79013 | v8 = 44.2 |
| r14 = 31.613 | d14 = 3.84 | n9 = 1.85501 | v9 = 23.9 |
| r15 = 1125.345 | d15 = variable | 1.00000 | |
| r16 = (diaphragm) | d16 = 1.60 | 1.00000 | |
| r17 = | d17 = 4.73 | n10 = 1.62287 | v10 = 60.3 |
| r18 = −30.301 | d18 = 0.20 | 1.00000 | |
| r19 = −314.637 | d19 = 6.99 | n11 = 1.52033 | v11 = 58.9 |
| r20 = −19.514 | d20 = 1.20 | n12 = 1.93945 | v12 = 42.7 |
| r21 = −62.330 | d21 = 0.20 | 1.00000 | |
| r22 = 47.509 | d22 = 5.72 | n13 = 1.51977 | v13 = 52.4 |
| r23 = −83.974 | d23 = variable | 1.00000 | |
| r24 = 95.840 | d24 = 1.20 | n14 = 1.85504 | v14 = 23.8 |
| r25 = 32.514 | d25 = 2.01 | 1.00000 | |
| r26 = 78.907 | d26 = 4.80 | n15 = 1.48915 | v15 = 70.2 |
| r27 = −46.367 | d27 = 0.20 | 1.00000 | |
| r28 = 28.293 | d28 = 5.65 | n16 = 1.48915 | v16 = 70.2 |
| r29 = −133.006 | d29 = variable | 1.00000 | |
| r30 = | d30 = 29.00 | n17 = 1.60718 | v17 = 38.0 |
| r31 = | d31 = 11.20 | n18 = 1.51825 | v18 = 64.2 |
| r32 = | d32 = 8.00 | 1.00000 | |

| Focal Length/ Variable interval | 8.14 | 30.12 | 111.51 |
|---|---|---|---|
| d7 | 2.78 | 30.48 | 49.55 |
| d12 | 50.26 | 14.17 | 3.78 |
| d15 | 1.81 | 6.20 | 1.52 |
| d23 | 22.00 | 22.00 | 22.00 |
| d29 | 7.80 | 7.80 | 7.80 |

First, the feature of the front focus lens unit F1 as the first lens unit in this numerical example will be explained. As described above, the front focus lens unit F1 as a whole has positive optical power and moves to the object side on the optical axis when focusing on an object at a short distance.

In this numerical example, the movement amount Sx1 of the front focus lens unit F1 at the minimum object distance of 1.0 m is −6.3173 mm in the entire area of zooming when the image plane side is assumed to be positive. The front focus lens unit F1 has an air distance of 2.77 mm from the variator lens unit V when focusing is achieved at infinity and secures 2.0 mm as the range of movement Δx1 in the autofocus mode.

The value of the left side of Expression (7) in this numerical example is:

$$|\Delta x1/Sx1|=0.317$$

which satisfies the condition and suppresses an increase in the diameter of the front focus lens unit F1 and the total length of the zoom lens with the increase in the movement amount of the front focus lens unit F1.

Furthermore, converted inclination angles α1 and α1' of the axial ray before and after the front focus lens unit F1 are:

$$\alpha 1=0$$

$$\alpha 1'=1.456$$

Therefore, back focal distance sensitivity dsk1 of the front focus lens unit F1 at the telephoto end is:

$$dsk1=\alpha 1'^2-\alpha 1^2=2.121$$

Next, the feature of the rear focus lens unit F2 as the fifth lens unit in this numerical example will be explained. As described above, the rear focus lens unit F2 as a whole has positive optical power and moves toward the object side on the optical axis when focusing on an object at a short distance. In this numerical example, the movement amount of the rear focus lens unit F2 at the minimum object distance of 1.0 m is −0.065 mm at the wide angle end and −8.239 mm at the telephoto end, where the image plane side is assumed to be positive.

Converted inclination angles α2 and α2' of the axial ray before and after the rear focus lens unit F2 are:

$$\alpha 2=0.158$$

$$\alpha 2'=1$$

Therefore, back focal distance sensitivity dsk2 of the rear focus lens unit F2 at the telephoto end is:

$$dsk2=\alpha 2'^2-\alpha 2^2=0.975$$

In this numerical example, the air interval between the relay lens unit FR which is the fourth lens unit and rear focus lens unit F2 is 22.0 mm, the back focal distance is 37.2 mm (equivalent in the air) and 4.5 mm is secured as the amount of movement margin Δx2 of the rear focus lens unit F2.

From above, the value of conditional expression (7) is:

$$|(4.5\times 0.975)/(-2.0\times 2.121)|=1.03$$

which satisfies the condition. This suppresses an increase in the total length of the zoom lens caused by an increase in the movement amount of the rear focus lens unit F2 and makes it possible to achieve focusing from the infinity to the minimum object distance by the rear focus lens unit F2 during autofocusing, even when the front focus lens unit F1 has moved from the infinity position by a maximum of ±Δx1 as a result of fine adjustment of focusing.

In this numerical example, a movable stopper S which operates only in the autofocus mode is provided so that the movement amount of the front focus lens unit F1 does not exceed ±2.0 mm.

The above described embodiment has described the zoom lens apparatus based on a zooming system with the second lens unit and third lens unit in a configuration of positive, negative, negative and positive lenses moving during power variation, but the present invention is not limited to the zoom system and is also applicable to a zoom lens having focus lens units closer to the object and image plane than the variator lens unit.

For example, a zoom lens apparatus for broadcast or professional video often uses a zoom system with the second lens unit moving for power variation and the third lens unit moving for compensation for variations of the image plane in a configuration of positive, negative, positive and positive lenses, but it is also possible to use the first lens unit as the object-side focus lens unit and the fourth lens unit as the image plane-side focus lens unit. Furthermore, there can also be three or more lens units which move during power variation.

Furthermore, the above described embodiment performs focusing by movement of the entire first lens unit, but the present invention can adapt to a zoom lens apparatus in which only some lens elements of the first lens unit are used for focusing.

Furthermore, the above described embodiment has described the case where the lens unit closest to the image plane is used as the image plane-side focus lens unit, but any lens unit can be used as the image plane-side focus lens unit if it is at least closer to the image plane than the variator lens unit.

As described above, this embodiment can realize a small zoom lens apparatus capable of realizing faster and more accurate focusing through manual operations, easily performing intentional focusing for image effects and allowing focusing through manual operations in the autofocus mode without losing operational feeling of manual focusing.

What is claimed is:

1. A zoom lens apparatus comprising:
   a variator lens unit which carries out power variation by moving in the direction of an optical axis;
   an object-side focus lens unit provided closer to an object than the variator lens unit for carrying out focusing by moving in the direction of the optical axis;
   an image plane-side focus lens unit provided closer to an image plane than the variator lens unit for carrying out focusing by moving in the direction of the optical axis; and
   a controller which controls autofocus by driving the image plane-side focus lens unit when an autofocus mode is set,
   wherein driving of the object-side focus lens unit through manual operations is allowed when the autofocus mode is set.

2. The zoom lens apparatus according to claim 1, further comprising a limiting member which limits the movement range of the object-side focus lens unit in the autofocus mode.

3. The zoom lens apparatus according to claim 1, wherein the following condition is satisfied:

$$1<|\Delta x2\cdot(\alpha 2'^2-\alpha 2^2)/\Delta x1\cdot(\alpha 1'^2-\alpha 1^2)|<1.2$$

where Δx1 is an allowable movement amount of the object-side focus lens unit from a position where focusing to infinity is achieved to an object side or image plane side when the autofocus mode is set, $\Delta x2$ is an allowable movement amount of the image plane-side focus lens unit from the infinity focusing position to the image plane side or an allowable movement amount from a position where focusing to a minimum object distance is achieved to the object side, $\alpha 1$ and $\alpha 1'$ are converted inclination angles of an axial ray on the object side and image plane side of the object-side focus lens unit at the telephoto end and $\alpha 2$ and $\alpha 2'$ are converted inclination angles of the axial ray on the object side and image plane-side of the image plane-side focus lens unit at the telephoto end.

4. The zoom lens apparatus according to claim 1, wherein the following condition is satisfied:

$$|\Delta x1/Sx1|<0.5$$

where $\Delta x1$ is an allowable movement amount of the object-side focus lens unit from a position where focusing to infinity is achieved to the object side or image plane side when the autofocus mode is set and $Sx1$ is a movement amount of the object-side focus lens unit at a position where focusing to a minimum object distance is achieved to the object side with respect to the infinity focusing position.

5. The zoom lens apparatus according to claim 3, comprising a movable limiting member which limits the movement range of the object-side focus lens unit in the autofocus mode so as not to exceed the allowable movement amount $\Delta x1$ specified by the conditional expression according to claim 3.

6. The zoom lens apparatus according to claim 4, comprising a movable limiting member which limits the movement range of the object-side focus lens unit in the autofocus mode so as not to exceed the allowable movement amount $\Delta x1$ specified by the conditional expression according to claim 4.

7. The zoom lens apparatus according to claim 1, further comprising:

a first lens unit which has positive optical power as the object-side focus lens unit which is fixed during power variation;

a second lens unit which has negative optical power as the variator lens unit;

a third lens unit which compensates for image plane variations caused by power variation by moving in the direction of the optical axis;

a fixed fourth lens unit; and a positive fifth lens unit as the image plane-side focus lens unit, in that order from the object side.

8. A camera system comprising:

a zoom lens apparatus according to claim 1; and a camera in which the zoom lens apparatus is mounted for recording an object image formed by the zoom lens apparatus.

* * * * *